United States Patent Office 3,456,978
Patented July 22, 1969

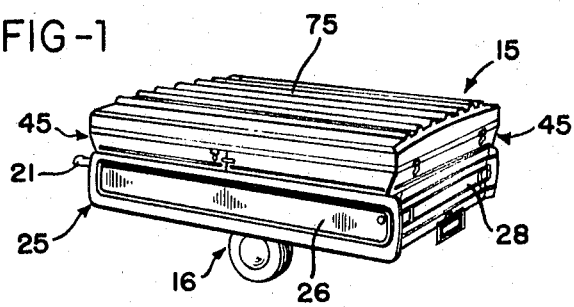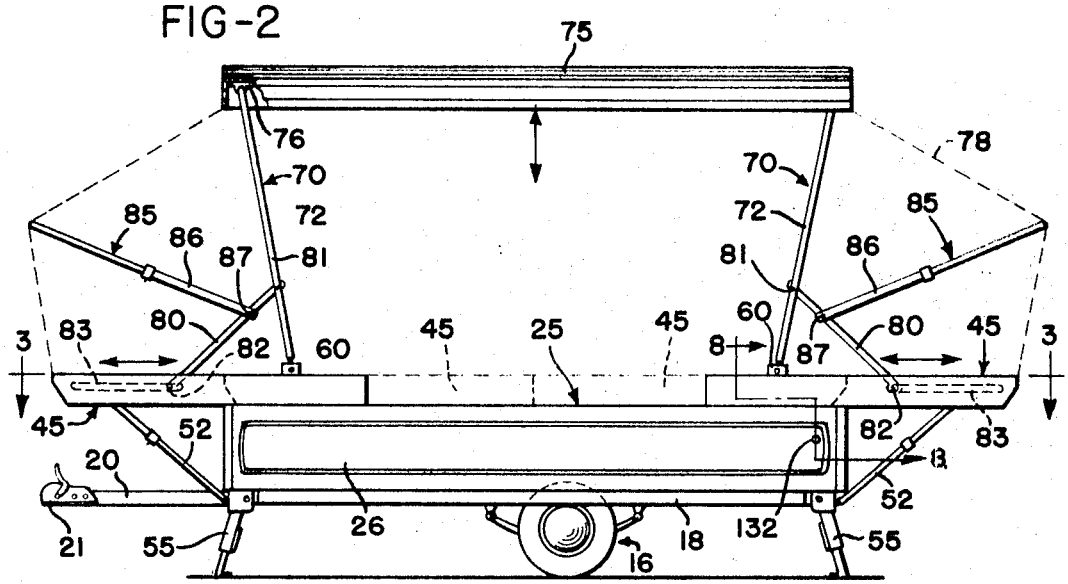

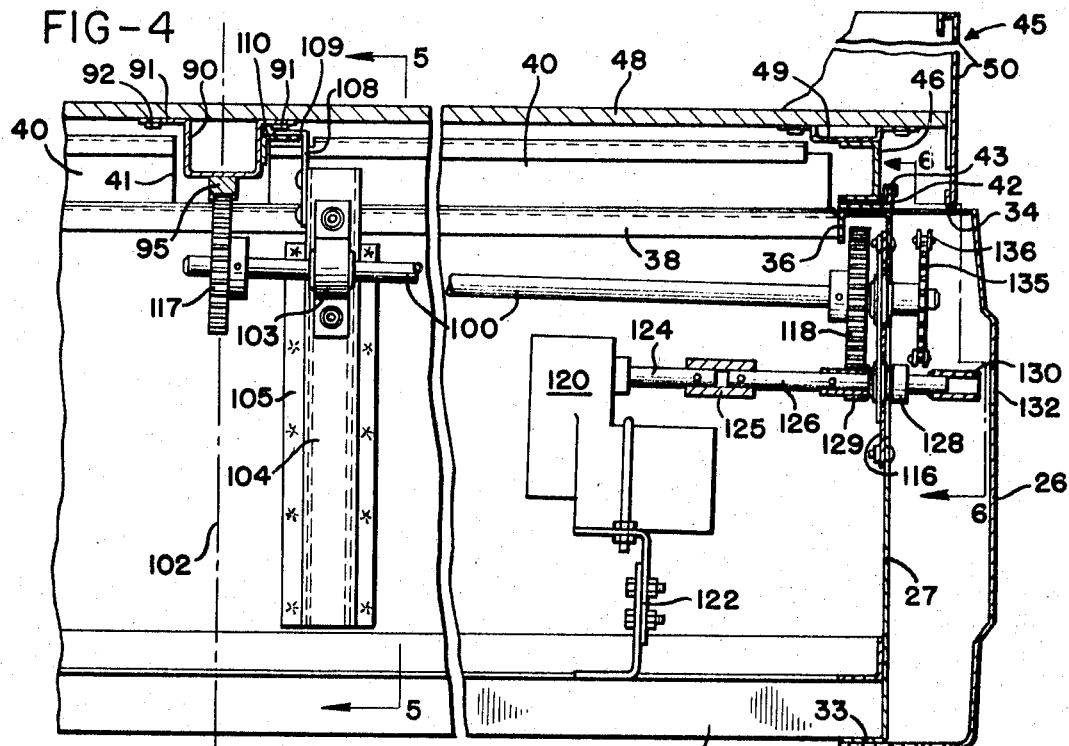
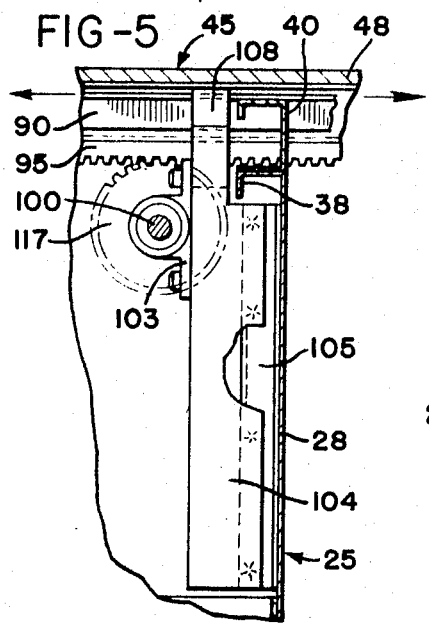
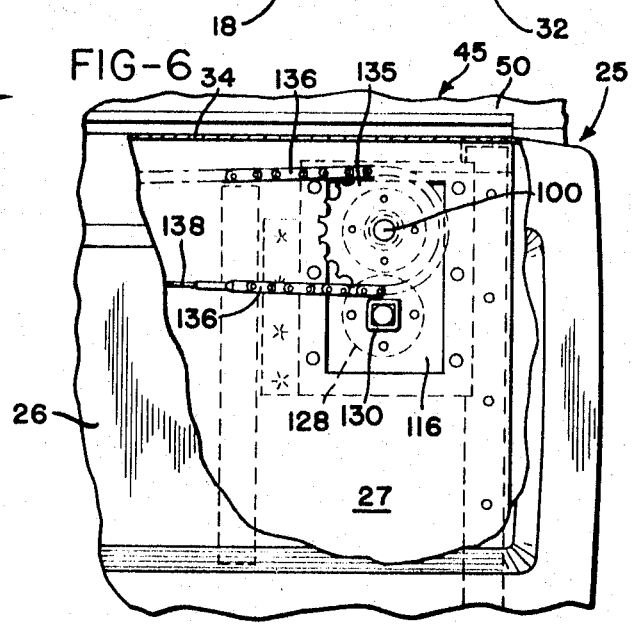
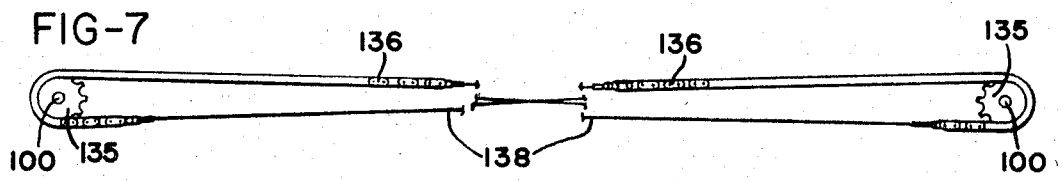

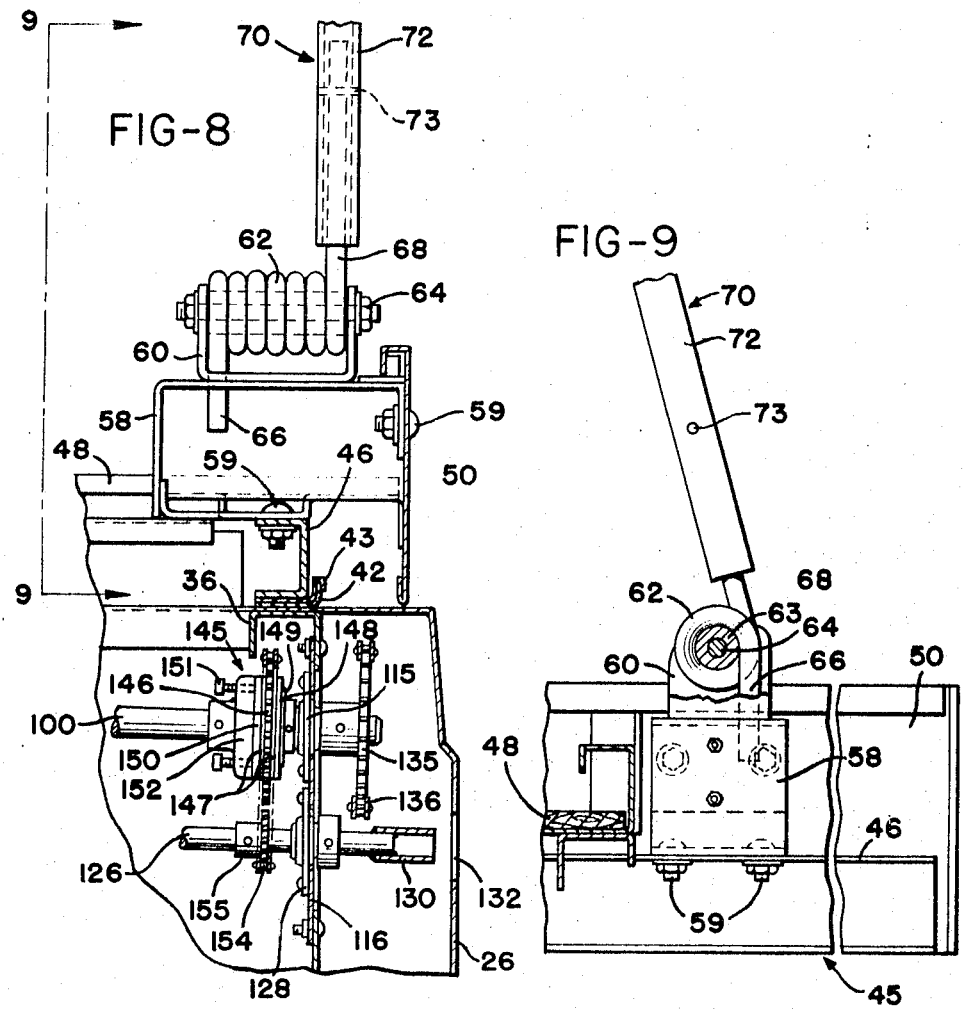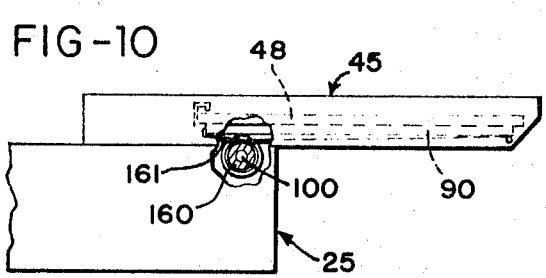

3,456,978
COLLAPSIBLE CAMPING TRAILER
Lawrence E. Daniels, Florence, Ky., and William B. Hunter, Hamilton, Ohio, assignors to Ward Manufacturing, Inc., Hamilton, Ohio, a corporation of Ohio
Filed June 1, 1967, Ser. No. 642,956
Int. Cl. B60p 3/34, 3/32
U.S. Cl. 296—23                                         9 Claims

ABSTRACT OF THE DISCLOSURE

A camping trailer in which a body supports a pair of horizontally disposed beds movable between retracted and extended positions includes a substantially rigid cover extending over the beds in the retracted positions and connected to the beds by pivotable legs for movement to an elevated position in response to extension of the beds, and a drive mechanism for moving the beds simultaneously to provide quick and convenient setup and collapsing of the trailer.

Background of the invention

In camping trailers employing a two-wheeled chassis supporting a generally rectangular body, it is common to mount a pair of horizontally disposed beds on the body for movement horizontally between retracted and extended position. Usually the trailer is provided with some form of cover which is collapsed when the beds are retracted and is erected or elevated when the beds are extended to provide a protected living and sleeping area.

One form of cover which is commonly used is a canvas tent which is attached at its base to the beds and the body and is erected by moving pivotable U-shaped bows to a generally upright position. Another form of cover comprises a substantially rigid rectangular top which extends over the beds in their retracted position to provide a protective top for the trailer, and has mounted on each end a pivotable bow which is pivotally connected to the corresponding bed so that when the beds are extended, the top automatically raises to an elevated position. A flexible material such as canvas is connected around the periphery of the top and extends downwardly to the body and over extended bows to the beds.

To set up a camping trailer having extendable beds and a rigid top as described above, usually two people stand at opposite ends of the trailer and pull out simultaneously on the pair of beds, or one person goes alternately to each end of the tralier and pulls each bed out separately. Due to the weight of the rigid top and the poor mechanical advantage provided by the generally horizontally bows connecting the top to the beds when the beds are retracted, a substantial pulling force is required to extend the beds and produce simultaneous elevation of the top. It is the primary object of this invention to provide a camping trailer of such construction that one person can quickly and conveniently extend and retract both of the beds as well as elevate and collapse the top to simplify and minimize the time for setting up and collapsing the camping trailer.

Summary of the invention

The present invention is directed to a collapsible camping trailer as oultined above which incorporates an improved and simplified mechanism for extending and retracting the beds and the top, and which can be quickly operated from one position so that the trailer can be conveniently set up and collapsed thereby simplifying the use of the trailer. The mechanism is highly dependable in construction and is arranged so that it does not interfere with the usable space of the trailer. In addition, the mechanism is located so that it is always protected from exposure to water or mud sprayed from the road and may be operated either manually by a crank or by a motor driven speed reducing unit powered by a battery carried either by the trailer or by the towing vehicle.

In one form of the invention, the mechanism incorporates a pair of parallel spaced drive shafts which extend adjacent opposite ends of the trailer and laterally in relation to the direction of movement of the beds. Each shaft is connected to the central portion of the corresponding bed by either a drum and cable arrangement or by a rack and pinion so that rotation of each shaft in reversing directions is effective to produce extension and retraction of the corresponding bed. The shafts are connected together for simultaneous rotation in opposite directions by chains which extend adjacent a side wall of the trailer body and are directed around correpsonding sprockets mounted on the shafts. A slip clutch is included in the mechanism to prevent jamming of the mechanism or damaging a component of the trailer in case the mechanism is operated before the beds are released.

Brief description of the drawings

FIG. 1 is a perspective view of a collapsed camping trailer incorporating a mechanism constructed in accordancew ith the invention;

FIG. 2 is a side view of the camping trailer shown in FIG. 1 in its erected or extended condition and with the canvas wall shown in outline;

FIG. 3 is a somewhat schematic plan view of the trailer taken generally on the line 3—3 of FIG. 2 and with internal components removed;

FIG. 4 is a fragmentary section taken generally on the line 4—4 of FIG. 3;

FIG. 5 is a fragmentary section taken generally on the line 5—5 of FIG. 4;

FIG. 6 is a fragmentary elevational view of the trailer with a portion shown in section as taken generally on the line 6—6 of FIG. 4;

FIG. 7 is an elevational view of a drive connection for producing simultaneous movement of the beds;

FIG. 8 is a fragmentary section as taken generally on the line 8—8 of FIG. 2 and showing a somewhat modified form of a mechanism constructed in accordance with the invention;

FIG. 9 is a fragmentary section taken generally on the line 9—9 of FIG. 8 and with a portion broken away; and FIG. 10 is a schematic elevational view of a modified form of the portion of the mechanism shown in FIG. 5.

Brief description of preferred embodiments

Referring to FIGS. 1–3, a camping trailer 15 incorporates a two-wheeled chassis 16 including a frame 18 from which extends a tow bar 20 having a hitch 21. The chassis 16 supports a rectangular body 25 having generally parallel spaced outer and inner side walls 26 and 27, respectively (FIG. 4), and parallel spaced end walls 28. As shown in FIG. 3, an access door 30 is provided within the right side walls 26 and 27.

Referring to FIG. 4, each outer side wall 26 includes an inwardly extending lower portion 32 which is secured to an adjacent flange 33 formed inwardly at the bottom of the corresponding inner side wall 27. Each outer side wall 26 also includes an upper portion 34 which extends inwardly for connection with an inverted channel portion 36 formed at the top of the corresponding inner side wall 27. As shown in FIGS. 4 and 5, each end wall 28 is provided with a corresponding inverted channel portion 38 which connects the channel portions 36 of the inner side walls 27 and supports a set of aligned channel members 40 which are longitudinally spaced to define a gap 41 (FIG. 4). An angle shaped elongated track 42 is supported by the channel portion 36 of each inner side wall 27, and each track is covered by a low friction plastic liner 43.

A pair of horizontally disposed beds 45 are supported by the body 25, and each bed includes a pair of parallel spaced support channels 46 which are slidably mounted on the corresponding track liners 43. The channels have inner end portions which extend under brackets (not shown) for holding the channels on the corresponding tracks. A rectangular platform 48 is supported by each pair of channels 46 through corresponding elongated reinforcing battens 49, and a U-shaped wall member 50 (FIG. 4) extends around both ends and the outer edge of each platform 48 to form a well for receiving a mattress (not shown). The beds 45 are thus supported by the tracks 42 for horizontal movement between retracted positions (FIG. 1) and extended positions (FIG. 2) where each bed is reinforced by a pair of braces 52 extending ownwardly from the outer corners of the beds to corresponding brackets 53 on which are mounted retractable stabilizing supports 55.

Referring to FIG. 8, a generally rectangular strap member 58 is mounted on each bed channel 46 adjacent the inner corner of the corresponding platform 48 and is secured to the channel and the wall member 50 by bolts 59. A U-shaped bracket 60 is mounted on each strap member 58 and suports a torsion coil spring 62 which is mounted on a tube 63 secured to the bracket 60 by a bolt 64. Each spring 62 has one end portion 66 which extends downwardly through aligned holes formed within the supporting bracket 60 and strap member 58 and an opposite upwardly extending end portion 68.

An inverted U-shaped tubular bow 70 (FIGS. 2, 8 and 9) is supported by each bed 45 and includes a horizontally extending portion (not shown) integrally connecting a pair of tubular leg portions 72 which receive the corresponding end portions 68 of the torsion spring 62. A cross pin 73 (FIG. 8) secures each leg portion 72 to the end portion 68 of the corresponding spring 62.

A substantially rigid top 75 having a rectangular configuration corresponding generally to that of the trailer body 25 is supported at each end by one of the bows 70 and is rotatably connected to the horizontally extending portion of the bow by U-brackets 76. As illustrated by the dotted lines 78 in FIG. 2, a sheet of flexible material such as canvas extends from the periphery of the top 75 downwardly to the beds 45 and also to the outer side walls 26 of the body 25.

A brace 80 is pivotally connected on one end to each leg portion 72 of each bow 70 by a pin 81, and a stop member (not shown) is pivotally connected to the opposite end of each brace by a pin 82. Each stop member is slidably supported within a track 83 mounted on the adjacent inner surface of the wall 50 of the corresponding bed 45. The braces 80 are effective to prevent pivoting of the coresponding bow 70 beyond a predetermined angle relative to the supporting bed 45. An extendable bow 85 having telescopic end portions 86 is pivotally connected at 87 to the pair of braces 80 connected to each bed 45.

Referring to FIGS. 4 and 5, an elongated channel 90 having coplanar flanges 91 is secured to the central portion of each platform 48 by a series of bolts 92 and extends parallel to the support channels 46. An elongated rack 95 is mounted on the bottom surface of each channel 90, and the combined rack 95 and channel 90 are adapted to extend through the gap 41 defined by the channel portions 40 of the adjacent end wall when the corresponding bed is extended.

A drive shaft 100 (FIGS. 4 and 5) extends adjacent each end wall 28 of the trailer body 25 and slopes slightly upwardly from the left inner side wall 27 (FIG. 4) generally to the centerline 102 of the trailer body. Each shaft 100 is rotatably supported adjacent the center of the trailer by a bearing 103 (FIGS. 4 and 5) mounted on a vertically extending support channel 104 which is secured to an elongated bracket 105 mounted on the adjacent end wall 28. An inverted L-shaped bracket 108 (FIG. 4) is mounted on the upper end portion of the support channel 104 and includes a flange 109 which extends between the adjacent flange 91 of the channel 90 and a longitudinally extending angle member 110 mounted on the adjacent side of the channel 90. The bracket 108 cooperates with the member 110 to prevent raising of the rack 95 relative to the upper channel portion 38 of the adjacent end wall 28.

Each shaft 100 is also rotatably supported by a bearing 115 which is mounted on a plate 116 secured to the left inner side wall 27 of the body. A gear 117 is mounted on the inner end portion of each shaft 100 and engages the adjacent rack 95 and a similar gear 118 is mounted on the rear shaft 100 adjacent the left inner side wall 27 of the body and is positioned adjacent the corresponding support bearing 115.

A motor driven speed reducing unit 120 is supported by an adjustable bracket 122 secured to the frame 18 and is adapted to be powered by a battery (not shown) which is carried either by the trailer or by the towing vehicle. The unit 120 includes an output shaft 124 which is connected by a coupling 125 to a stub shaft 126 rotatably supported by a bearing 128 mounted on the left rear plate 116 below the bearing 115. A pinion 129 is mounted on the stub shaft 126 in mesh with the gear 118, and a socket 130 formed by a section of square tubing is secured to the outer end portion of the stub shaft 126 to form a socket for receiving the end of a crank (not shown) which is inserted through an opening 132 formed within the left outer side wall 26.

A sprocket 135 is mounted on the outer end portion of each drive shaft 100 between the left outer side wall 26 and the corresponding inner wall 27. Referring to FIG. 7, a chain 136 extends around each sprocket 135, and opposite corresponding end portions of the chains 136 are connected by rods 138 which cross to provide simultaneous rotation of the shafts 100 in opposite directions. As shown generally in FIG. 3, the chains 136 and rods 138 extend between the left outer side wall 26 and inner side wall 27 which is provided with suitable access openings (not shown) for an adjusting turn buckle (not shown) mounted within one of the rods 138 for initially adjusting the tension of the chains 136. The rods 138 may be replaced by corresponding cables without departing from the scope of the invention.

Referring to FIG. 8, which shows a modified form of an operating mechanism constructed in accordance with the invention, a slip clutch 145 is mounted on one drive shaft 100 in place of the gear 118 and includes a sprocket 146 which is confined between a pair of annular friction pads 147. The pads 147 are confined between a pressure plate 148 secured to the shaft 100 adjacent a belleville spring 149 and a flat pressure plate 150 which is engaged by a series of screws 151 extending through a hub member 152 also secured to the shaft 100. The sprocket 146 is driven by a chain 154 extending around a smaller sprocket 155 mounted on the stub shaft 126 in place of the pinion 129. Thus by adjusting the screws 151, the drag friction between the sprocket 146 and the friction pads 147 can be adjusted so that the sprocket 146 will slip relative to the pads and rotate on the shaft 100 when a predetermined torque is exceeded.

Referring to FIG. 10, which shows another modification of the operating mechanism, a drum 160 is mounted on the inner end portion of each drive shaft 100 in place of the gear 116, and the rack 95 is replaced by a cable which has opposite end portions secured to the ends of the channel 90 and is wrapped a few turns around the drum 160. The drum and cable arrangement provides the advantage of eliminating the hold down bracket 108

(FIG. 4) which assures that the rack 95 remains in mesh with the gear 116 and is somewhat more economical in construction than the rack and gear arrangement.

To operate the motor driven speed reducing unit 120, a switch is located immediately within the door 30 so that when it is desired to set up the trailer from its collapsed position shown in FIG. 1, the door 30 is opened and the switch is actuated. As the unit 120 rotates the shafts 100 in opposite directions, the beds 45 are extended, which also causes the top 75 to rise as a result of the connection of each end of the top to the corresponding bed 45 by one of the bows 70. The torsion coil springs 62 also assist in elevating the top 75 as they produce a substantial biasing force on each of the bows 70 tending to move the bow towards an upright position as shown in FIG. 2. After the beds are fully extended, the bows 85 are extended to support the canvas 78 in the form of a tent portion over each of the beds 45. The braces 52 are also positioned in place as shown in FIG. 2 for supporting the outer portion of each bed.

When it is desired to collapse the trailer, the above procedure is reversed, and the drive unit 120 is operated in the reverse direction. As mentioned above, the stub shaft 126 may also be rotated manually by inserting a crank into the socket 130. This provision is desirable in case the battery which powers the unit 120 should fail. Of course, if only manual operation is desired, the unit 120 may simply be replaced by a bearing which supports the inner end portion of the stub shaft 126.

From the drawings and the above description, it can be seen that a camping trailer provided with an operating mechanism constructed in accordance with the invention provides several desirable features and advantages. For example, by connecting the ends of the top 75 to the beds 45 by the spring biased bows 60 and by interconnecting the beds for simultaneous movement, the beds may be extended and retracted and the top 75 raised and lowered simply by energizing the motor driven unit 120 or by rotating a crank inserted within the socket 130. As a result, the trailer can be quickly set up and collapsed by an adult or a child with little effort.

Another important feature is provided by connecting each shaft 100 to the central portion of its corresponding bed 45 through either the rack 95 and gear 116 or the cable 161 and drum 160. That is, the beds are extended and retracted by a force exerted at the center of the beds which provides for smooth movement of the beds and prevents twisting and cocking of the beds relative to the corresponding supporting tracks 72. Another feature is provided by the overall arrangement of the bed operating mechanism wherein the drive shafts 100 extend adjacent the end walls 28 of the trailer body and are connected by the chains 136 and rods 138 which extend between the left inner side wall 27 and left outer side wall 26 of the body so that the mechanism does not interfere with the usable space of the trailer and is completely protected by the body from exposure to water and dirt sprayed from the road.

The slip clutch 145 shown in FIG. 8 provides another feature of the invention. That is, by adjusting the screws 151, the slip clutch can be set so that the sprocket 150 will rotate relative to the supporting drive shaft 100 when the torque exceeds a predetermined maximum limit. Thus if the motor driven unit 120 remains energized or the operator continues to turn the crank connected to the socket 130 after the beds are completely extended or retracted, the sprocket 150 will slip and thereby prevent overstressing or jamming of the mechanism. The slip clutch is also effective to prevent damage to the beds or braces 52 in the event the stub shaft 126 is inadvertently rotated to retract the beds 45 before the bed braces 52 are released.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A collapsible camping trailer or the like, comprising a body having spaced side walls connected by spaced end walls, a pair of horizontally disposed beds, means mounting said beds on said body for movement between retracted and extended positions relative to said end walls, collapsible cover means extending over said body and said bed in said extended positions, a pair of generally parallel spaced shafts extending under said beds adjacent said end walls and normal to the direction of movement of said beds, means connecting each said shaft to the corresponding said bed for moving said bed in response to rotation of said shaft, means extending adjacent one of said side walls for connecting said shafts to effect simultaneous rotation of said shafts, drive means connected to said shafts and operable at a predetermined location for simultaneously extending and retracting said beds to provide for convenient setup and collapsing of the trailer, and said drive means include slip clutch means connected to provide relative rotation between said drive means and said shafts when the torque of said drive means reaches a predetermined limit.

2. A camping trailer as defined in claim 1 wherein said drive means include a drum mounted on each said shaft, and flexible means wrapped around each said drum and connected to the corresponding said bed.

3. A camping trailer as defined in claim 1 wherein said drive means include a rack mounted on the central portion of each said bed adjacent the underneath surface and extending parallel to the direction of movement of said bed, a pinion mounted on each said drive shaft and engaging the corresponding said rack, a sprocket mounted on each said shaft adjacent said side wall of said body, and connected chain means extending around said sprocket for producing simultaneous rotation of said shafts.

4. A camping trailer as defined in claim 1 wherein said connecting means for said shaft include a sprocket mounted on each said shaft, a chain of predetermined length directed around each said sprocket, and means connecting said chains.

5. A camping trailer as defined in claim 1 wherein said drive means include a motor-operated speed reducing unit having an output shaft, means connecting said output shaft to one of said drive shafts to produce rotation of said drive shafts in response to rotation of said output shaft, and socket means connected to at least one of said shafts and adapted to receive a crank to provide alternate manual operation of said drive means.

6. A collapsible camping trailer or the like, comprising a body having spaced side walls connected by spaced end walls, a pair of horizontally disposed beds, means mounting said beds on said body for movement between retracted and extended positions relative to said end walls, collapsible cover means extending over said body and said bed in said extended positions, a pair of generally parallel spaced shafts extending under said beds adjacent said end walls and normal to the direction of movement of said beds, means connecting each said shaft to the corresponding said bed for moving said bed in response to rotation of said shaft, means extending adjacent one of said side walls for connecting said shafts to effect simultaneous rotation of said shafts, drive means connected to said shafts and operable at a predetermined location for simultaneously extending and retracting said beds to provide for convenient setup and collapsing of the trailer, and said drive means includes a reversible motor-operated speed reducing unit.

7. A camping trailer as defined in claim 6 including socket means connected to at least one of said drive shafts and adapted to receive a crank to provide manual rotation of said drive shafts, and a slip clutch connected between said socket means and the said drive shafts to provide relative rotation between said socket means and said drive shafts when the torque on either of said drive shafts reaches a predetermined limit.

8. A collapsible camping trailer or the like, comprising a body having spaced side walls connected by spaced end walls, a pair of horizontally disposed beds mounted on said body for movement horizontally between retracted and extending positions relative to said end walls, a substantially rigid top disposed in a covering relation over said beds in said retracted position, a pair of support legs pivotally mounted on said top and pivotally connected to each said bed for raising said top to an elevated position in response to movement of said beds to said extended position, spring bias means acting on each said leg and tending to move said leg in a direction to move said top to said elevated position, a pair of generally parallel spaced shafts extending under said beds adjacent said end walls and normal to the direction of movement of said beds, means connecting each said shaft to the corresponding said bed for moving said bed and said top in response to rotation of said shaft, means extending adjacent one of said side walls for connecting said shafts to effect simultaneous rotation of said shafts, and drive means connected to said shafts and operable at a predetermined location for simultaneously extending and retracting said beds to provide for convenient setup and collapsing of the trailer.

9. A camping trailer as defined in claim 8 wherein said pair of legs pivotally connected to each said bed are rigidly connected by a member extending horizontally adjacent said top to form a U-shaped bow, said spring bias means comprise a pair of torsion coil springs mounted on each said bed, and each said spring has an end portion connected to the corresponding said leg to form a pivot connection of said leg to said bed in addition to biasing said leg for assisting said drive means in extending said beds.

References Cited
UNITED STATES PATENTS

| | | | |
|---|---|---|---|
| 3,288,520 | 11/1966 | Krutzikowsky | 52—66 X |
| 3,194,251 | 7/1965 | Pettersen | 296—23 X |
| 3,013,836 | 12/1961 | Groh | 296—23 |
| 1,964,894 | 7/1934 | Rohne | 296—26 |

PHILIP GOODMAN, Primary Examiner

U.S. Cl. X.R.

52—66; 296—27